United States Patent

Chalmers

[15] 3,668,482
[45] June 6, 1972

[54] AN OFFSET, WOUND, SINGLE-WEB ROLL CAPACITOR AND PROCESS FOR MAKING SAME

[72] Inventor: David Johnstone Chalmers, Circleville, Ohio

[73] Assignee: E.I du Pont de Nemours and Company, Wilmington, Del.

[22] Filed: Feb. 9, 1971

[21] Appl. No.: 113,848

[52] U.S. Cl. .................................317/260, 29/25.42
[51] Int. Cl. ...........................................H01g 1/14
[58] Field of Search ............317/260, 258, 261; 29/25.42

[56] References Cited

UNITED STATES PATENTS

| 1,952,925 | 3/1934 | Kopinski | 317/260 |
| 2,785,351 | 3/1957 | Allison | 317/260 |
| 3,214,657 | 10/1965 | Davis | 317/260 X |

FOREIGN PATENTS OR APPLICATIONS

| 452,353 | 8/1936 | Great Britain | 317/261 |
| 748,899 | 5/1956 | Great Britain | 317/260 |

OTHER PUBLICATIONS

Dummer, Fixed and Variable Capacitors McGraw Hill N.Y., 1960, pp. 16 and 17

Primary Examiner—E. A. Goldberg
Attorney—Louis Del Vecchio

[57] ABSTRACT

An electrical capacitor comprising a single web of a metallized dielectric convolutely wound and having a metal coating on the terminal ends with an electrical connector attached to the metal coating, wherein the terminal connection between the metallized portion of the capacitor serving as an electrode and the metal coatings on the terminal ends is improved by offsetting the exposed edge portions of the layers formed by the convolutely wound web at the terminal ends with respect to each other.

7 Claims, 9 Drawing Figures

PATENTED JUN 6 1972
3,668,482
SHEET 1 OF 2
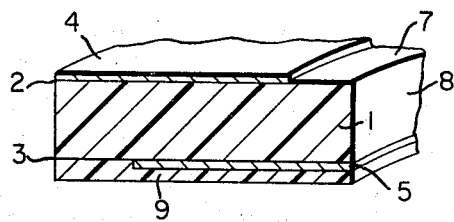
FIG. 1a
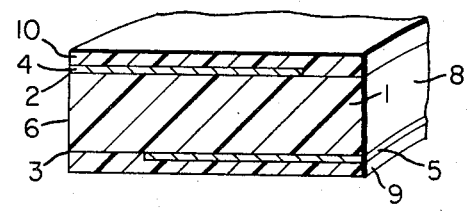
FIG. 1b
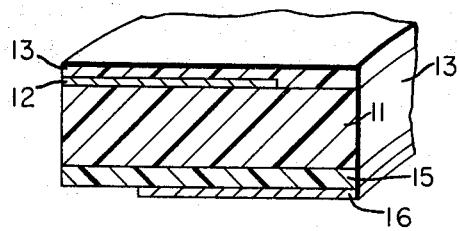
FIG. 1c
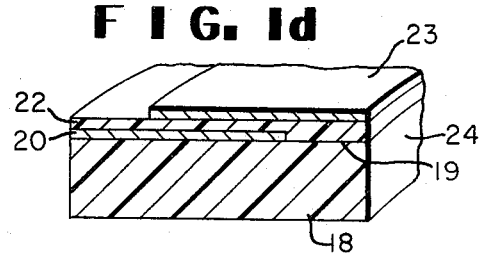
FIG. 1d
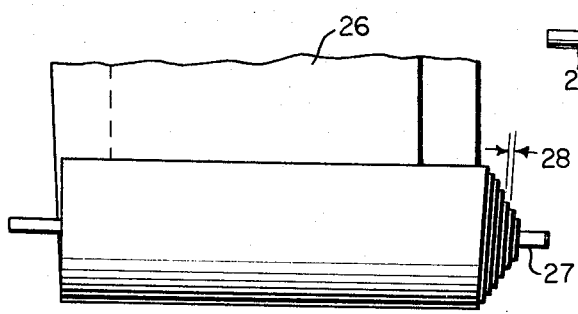
FIG. 2
FIG. 3
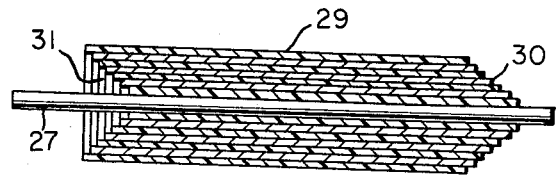
FIG. 4
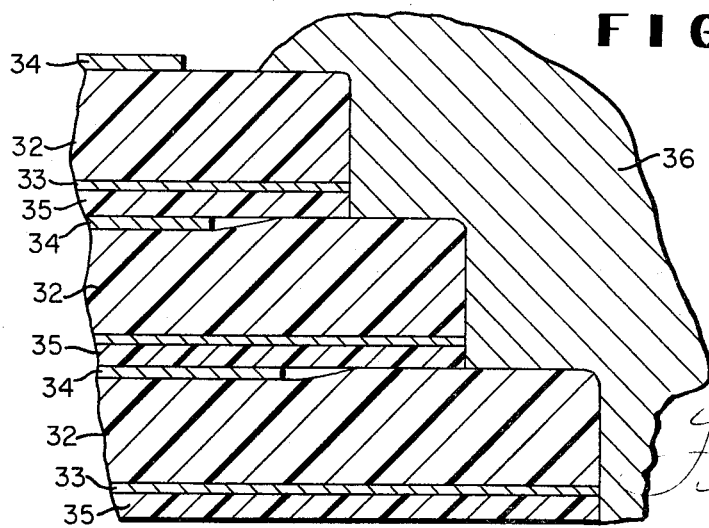
INVENTOR
DAVID JOHNSTONE CHALMERS
ATTORNEY

*INVENTOR*
DAVID JOHNSTONE CHALMERS

BY

*ATTORNEY*

3,668,482

OFFSET, WOUND, SINGLE-WEB ROLL CAPACITOR AND PROCESS FOR MAKING SAME

BACKGROUND OF THE INVENTION

This invention relates to an electrical capacitor having an improved end termination and a method of preparing the same.

In the field of electricity, a capacitor is defined as a device usually consisting of conducting plates or foils separated by thin layers of dielectric with the plates on opposite sides of the dielectric layer maintained at different electrical potentials. Electrical energy is stored in the dielectric material in an amount equal to the ratio of the charge on either surface to the potential difference between the surfaces.

The increasing complexity of the electronic equipment has made it undesirable to use bulky electrical components thereby providing the incentive to miniaturize electronic equipment including capacitors. It is well known that miniature capacitors can be made by a number of methods. One method particularly related to this invention is disclosed in U.S. Pat. No. 3,214,657. The method disclosed therein is to coat a polyethylene terephthalate film with metal so that the metal coating on one surface of the film is recessed at one edge to provide an uncoated margin. The coating process is reversed on the other surface of the film providing an uncoated margin along the opposite side edge of the film. The metal coatings in turn can be coated with a heat-sealable dielectric plastic material. This coated structure is then rolled in convoluted fashion on its transverse axis. The ends of the roll are sprayed with metal and an electrical connector is then soldered to each end resulting in a capacitor ready for use. This is considered a capacitor prepared from a single web in contrast to capacitors prepared from multiple webs wound in convoluted fashion.

When the resistivity of the metal electrodes is greater than 1 ohm per square centimeter, termination of These the ends of the capacitor by the above-described conventional method is not satisfactory because the contact between the metal electrodes and the metal sprayed on the ends is not sufficient. This unsatisfactory termination leads to an increase in the unwanted dissipation of electrical energy from the capacitor and sometimes results in the complete inability of the capacitor to hold any charge rendering the capacitor useless. Therefore, there is a need for an improved method of terminating a single web, convolutely wound capacitor.

SUMMARY OF THE INVENTION

Accordingly, the present invention provides an electrical capacitor having an improved terminal connection between the electrodes and the metal end coatings. The electrical capacitor comprises a single web of a metallized dielectric convolutely wound, having a metal coating on the terminal ends and an electrical connector attached to the metal coating of the terminal ends. The improvement comprises offsetting the exposed edge portions of the layers formed by the convolutely wound web at the terminal ends with respect to each other.

BRIEF DESCRIPTION OF THE DRAWINGS:

FIGS. 1 (a), (b), (c), and (d) show various constructions of metallized dielectrics useful in making capacitors of the present invention.

FIG. 2 shows a capacitor being wound having a cone shape on one end and an inverted cone shape on the other end.

FIG. 3 shows a cross section of a capacitor wound having a cone shape on one end and an inverted cone shape on the other end.

FIG. 4 shows an enlarged cross section of part of a cone-shaped end of a capacitor.

DETAILS OF THE INVENTION

Figure 5:
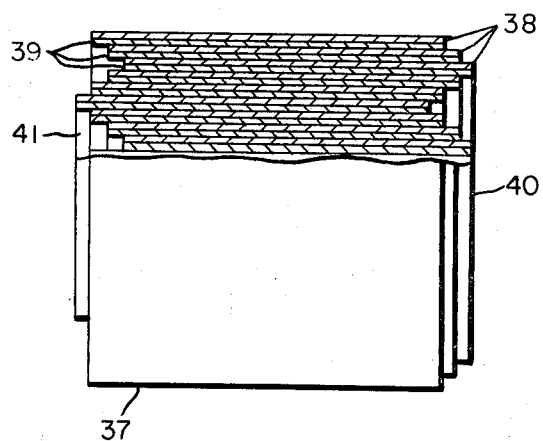
FIG. 5 shows an irregularly wound capacitor with the top portion in cross section.

The capacitors of the present invention are prepared from a single web. The web is made up of a base layer which is a dielectric having at least two electrodes on it and, optionally, coated with a dielectric coating material.

The base layer can be prepared from film-forming materials that have a dielectric constant of at least two and are flexible enough to be convolutely wound into a capacitor. Representative examples of useful base layers include polyolefins, e.g., polyethylene, polypropylene and polystyrene; cellulose esters; polyesters, e.g., polyethylene terephthalate, and polycarbonate; polyimides; and polyamides.

The preferred base layer is biaxially oriented, heat-set polyethylene terephthalate film which can be prepared by the process of Scarlett U.S. Pat. No. 2,823,421. This is preferred because it combines excellent strength properties with excellent dielectric properties. It is preferred that the dielectric base layer have a thickness of about 0.05 to 0.5 mil. This thin films provide a relatively high capacitance per volume of capacitor.

The metal serving as the electrodes can be applied to the base layer by various known techniques such as vacuum deposition, electroless deposition from solution, electrodeposition or lamination. The metal layers are conveniently applied to both sides of the base layer. However, the layers can be applied to one side of the base layer separated from each other by a dielectric material. In a typical capacitor incorporating only two electrode layers, one layer starts at one edge and, in a transverse direction, extends part of the way across the surface leaving the opposite edge uncoated; whereas, the second electrode layer, separated from the first electrode layer by a dielectric material, begins on the edge of the base layer left uncoated by the first electrode layer and extends in a transverse direction part of the way across the surface leaving the opposite edge uncoated.

Aluminum is generally used for metallizing the film but other materials such as copper, zinc, silver, or any pure or alloyed electrically conductive metal that can be made to adhere to the surface of the film can be employed. It is preferred that the metal layers be from 0.0005 to 0.003 mil in thickness. These thin metal layers are preferred because they are regenerative or self-healing, i.e., when a fault in the dielectric occurs, instead of the capacitor shorting out it only destroys that portion of the electrode in the region of the fault.

The dielectric coating material is preferably a heat-sealable plastic material preferably a polystyrene or a polycarbonate. Any heat-sealable material coating can be used so long as it has a dielectric constant above two and has a melting point below that of the dielectric sheet. Other useful heat-sealable plastic materials include polyester resins or high temperature waxes such as natural or synthetic waxes having a melting point over 75° C. Carnauba wax, a vegetable wax having a melting point between 86°–89° C., or Montan wax, a semimineral wax having a melting point between 83°–89° C., would be useful natural waxes for this application. A glycol based, synthetic wax like Acrawax Type C having a melting point between 140°–142° C. can also be used. The coatings can be applied to the metallized film by any conventional technique such as doctor blade coating, transfer roll coating, or gravure roll coating. The coatings should have a thickness of 0.01 to 0.5 mil and most preferably, a thickness of 0.05 to 0.15 mil.

The preferred carbonate resin is derived from aromatic dihydroxy compounds and carbonic acid. It can also be termed a polyarylcarbonate polymer. The polycarbonates can be prepared either by phosgenation of a dihydroxy aromatic compound or by an ester exchange between a carbonate diester and a dihydroxy aromatic compound. A preferred polycarbonate resin is the reaction product of phosgene and bisphenol A.

Typical webs useful in constructing capacitors, according to the present invention, will be described as they are shown in FIGS. 1(a), 1(b), 1(c), and 1(d).

FIG. 1(a) shows a base layer 1 as a dielectric, coated on two surfaces 2, the top, and 3, the bottom, with the metallic coating 4 and 5 wherein one coating 4 starts at one edge 6 and partially covers top surface 2 leaving an uncoated marginal portion 7 running along edge 8 and the second metallic coating 5 separated from metallic coating 4 by dielectric 1 starts on the edge 8 left uncoated by metallic coating 1 and partially covers bottom surface 3 leaving the metallic layers exposed along the edge on opposite sides of the film. Metallic coating 5 and the uncoated marginal portion of the bottom surface 3 are then coated with a dielectric 9.

FIG. 1(b) shows a web of the same structure as that shown in FIG. 1(a) except for the addition of a dielectric coating 10.

FIG. 1(c) shows a dielectric base layer 11 partially coated on the top surface with a metallic coating 12 leaving an uncoated marginal portion running along edge 13. Metallic layer 12 and the uncoated marginal portion thereof are then coated with a dielectric coating 14. The bottom surface of the same layer is first coated with a dielectric coating 15, and then coated with a metallic layer 16 over part of the dielectric surface leaving an uncoated marginal edge 17. The metallic coatings 12 and 16 are staggered so that only one metallic layer is exposed at each edge of the web.

FIG. 1(d) shows a dielectric base layer 18 coated only on the top surface 19 with three coatings. First is a metallic layer 20 extending from edge 21 part way across surface 19 leaving an uncoated marginal portion. Second is a dielectric coating 22 coated over metallic layer 20 and extended to cover the uncoated marginal portion left uncoated by metallic coating 20. Third is a metallic coating starting along edge 24 and extending part way across the exposed surface of dielectric layer 22 leaving an uncoated marginal portion 25 running along edge 20.

Still another useful web not shown in the drawings is constructed by coating a base film with at least two alternating layers of metal electrode and dielectric material. Thereafter, the base film which served as the structural support during the coating process, is peeled off and the remaining layered structure wound to form a capacitor.

Although this invention contemplates the use of a wide variety of single webs, the preferred web for use is an oriented polyethylene terephthalate base layer, coated on its top and bottom surfaces with aluminum and overcoated on one or both surfaces with polycarbonate or polystyrene. These embodiments are shown in FIGS. 1(a) and 1(b).

After the web is prepared, it is convolutely wound in such a manner that the edge portions of the convolution are offset with respect to each other. One method of obtaining an offset of the edge portions of the convoluted web will be explained in relation to FIG. 2. Web 26 is wound on mandrel 27. As the winding takes place, either mandrel 27 is uniformly moved in a transverse direction to the moving web that is in the direction of the protruding truncated cone end being formed or the web is moved in a transverse direction to the moving web that is away from the protruding truncated coned end being formed, or both the mandrel and the web are moved transverse to the direction of the moving web but in opposite directions. This results in a convolutely wound web wherein the offset edges or termination ends are regularly staggered by the measurement 28 indicated in FIG. 2 forming a truncated cone protruding on one end of the wound web and an inverted cone on the other end.

FIG. 3 shows a cross section of a convolutely wound web wound in the manner shown in FIG. 2. Referring to FIG. 2, a capacitor 29 is wound on mandrel 27. It can be seen from the drawing that the protruding end portion of the capacitor 30 forms a truncated cone wherein each wound layer of web is offset with respect to each other with a corresponding offset relationship existing at the other end of the capacitor 32. To more particularly point out the significance of this staggered relationship of one layer with respect to the other, refer to FIG. 4 wherein a blown-up portion of the truncated cone section 30 of FIG. 3 appears. In FIG. 4 the base film layer 32 is coated on both sides with metallized aluminum 33 and 34. In turn, the metallized aluminum layer 33 is overcoated with a dielectric coating material 35. The end of the capacitor is thereafter coated with a metal 36. It can be seen from the drawing that the electrodes 33 and 34 are now in excellent electrical conductive relationship to metal coating 36.

Although the preferred method of practicing this invention is to provide a regularly staggered relationship between the layers of a wound capacitor, nevertheless this invention can also be practiced by providing an irregularly staggered relationship between the wound layers. Such a relationship is shown in FIG. 5 wherein capacitor 37 has been wound in such a manner that the layers are irregularly staggered with respect to each other. This is clearly shown by the top portion which is in cross section. The wound film comprises a base layer 38 coated on one side with a metallized coating 39. As the layers are wound, it can be seen that each metallized layer 39 is separated by a dielectric 38. By having an irregularly staggered relationship between the layers, good electrical contact is assured when the end portions 40 and 41 are coated with a metal not shown.

Figure 6:
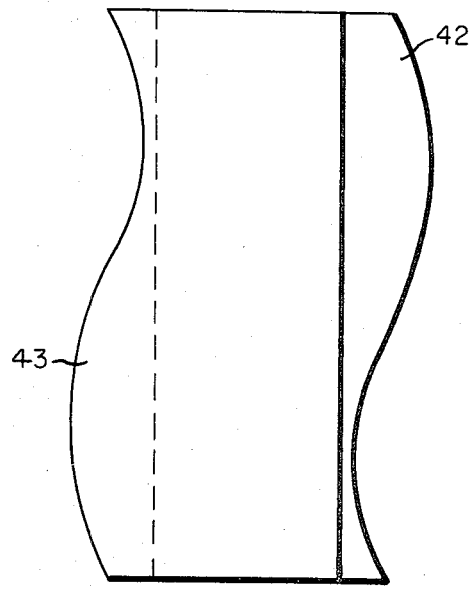
FIG. 6 shows a plan view of a sheet of a metallized dielectric useful in preparing a convolutely wound capacitor having offset terminal ends.

FIG. 6 shows a plan view of a dielectric base material 42 partially coated with a metallized coating material 43. By convolutely winding such a sheet of material, this will also provide a staggered relationship between each layer at the end portions of the convolutely wound web.

The degree of offset required in order to ensure excellent electrical bonding between the electrodes of the capacitor and the metal or solder sprayed on the end of the capacitor varies, depending on the size of the capacitor. Typically, it has been found that in a capacitor having a length of about ½ to 3 inches, a diameter of about ½ inch, representing about 20 to 50 wraps, and a capacitance between 0.5 and 1.0 microfarad, the offset from layer to layer should be about 1–2 mil.

In order to illustrate this invention, the following examples are provided.

EXAMPLES 1–5

A biaxially oriented and heat-set base film of polyethylene terephthalate having a thickness of 0.2 mil is coated on both sides with aluminum and thereafter one aluminum coating is overcoated with polycarbonate to a thickness of 0.11 mil. The aluminum coating is rated at 2.1 ohms per square. The configuration of the film is shown in FIG. 1(a).

Five capacitors are made by taking 2-inch-wide strips of coated film and convolutely winding the film strips while offsetting each layer of wound film about 1 mil relative to the next adjacent layer forming an end portion regularly staggered in the shape of a truncated cone protruding on one end and inverted on the other. About the same number of windings are used to produce five capacitors each having about the same amount of capacitance.

Each capacitor is terminated in the same conventional manner, i.e., by end spraying with molten spray babbitt.

The effectiveness of the termination is measured by the following test: The capacitance and dissipation factor (D.F.) are measured at 1,000 c.p.s. on a suitable bridge. Each capacitor is tested by charging the capacitor to at least 25 volts and thereafter discharging the capacitor. This charge and discharge cycle is repeated 100 times. The capacitance and dissipation factor are measured before the discharge testing begins and after the discharge testing has been completed. A dissipation factor greater than about 1 percent represents poor termination and is unacceptable for most commercial uses.

For comparison, five capacitors are prepared and tested in exactly the same manner as described above except that the wound layers are not offset with respect to each other.

Table I below is a tabulation of all test data and shows that all five capacitors prepared according to the present invention have a dissipation factor below 1 percent and are therefore acceptable; whereas, only one capacitor prepared by conventionally winding the capacitor has a dissipation factor below 1 percent and is acceptable.

TABLE I

| Ex. | before discharge testing Capacitance (microfarad) | D.F.(%) | after discharge testing Capacitance (microfarad) | D.F.(%) |
|---|---|---|---|---|
| 1 | 0.7374 | 0.34 | 0.7380 | 0.34 |
| 2 | 0.6667 | 0.36 | 0.6673 | 0.45 |
| 3 | 0.6959 | 0.52 | 0.6966 | 0.35 |
| 4 | 0.7325 | 0.43 | 0.7332 | 0.37 |
| 5 | 0.6944 | 0.37 | 0.6950 | 0.34 |
| Samples (for comparison) | | | | |
| A | 0.6443 | 17.0 | open capacitor | — |
| B | 0.7129 | 0.4 | 0.7131 | 0.4 |
| C | 0.6500 | 1.8 | 0.6447 | 14.2 |
| D | 0.6800 | 9.3 | open capacitor | — |
| E | 0.6706 | 0.4 | 0.6713 | 10.4 |

EXAMPLES 6–8

Three capacitors are prepared in the same manner as those described in examples 1–5. After the capacitors are made they are heat-treated by placing them in an oven at 125° C. for 4 hours. Heat treatment aids in preparing a more stable capacitor in that the capacitance has a reduced tendency to drift with increasing time.

These capacitors are tested in the same manner as those described in examples 1–5 and the results of the test data are reported below in table II.

For comparison, three capacitors are prepared and tested in exactly the same manner as examples 6–8 except that the wound layers are not offset with respect to each other. The results of testing these samples prepared for comparison are reported in table II below.

All three samples prepared according to the present invention have a dissipation factor less than 1 percent and are, therefore, acceptable. Only one out of three of the capacitors prepared by conventional winding has a dissipation factor below 1 percent and is acceptable.

TABLE II

| Ex. | before discharge testing Capacitance (microfarad) | D.F.(%) | after discharge testing Capacitance (microfarad) | D.F.(%) |
|---|---|---|---|---|
| 6 | 0.7371 | 0.37 | 0.7370 | 0.39 |
| 7 | 0.7855 | 0.46 | 0.7855 | 0.61 |
| 8 | 0.7672 | 0.42 | 0.7672 | 0.43 |
| Samples (for comparison) | | | | |
| F | 0.7095 | 0.49 | 0.7095 | 0.56 |
| G | 0.7013 | 47.0 | open capacitor | — |
| H | 0.7409 | 7.0 | open capacitor | — |

I claim:

1. In an electrical capacitor comprising a single web of a metallized dielectric convolutely wound and having a metal coating on the terminal ends with an electrical connector attached to the metal coating on the ends, the improvement in which the exposed edge portions of the layers formed by the convolutely wound web at the terminal ends are offset with respect to each other.

2. The electrical capacitor of claim 1 in which the offset exposed edge portions are irregularly staggered.

3. The electrical capacitor of claim 1 in which the offset exposed edge portions are regularly staggered in the shape of a truncated cone protruding on one end and an inverted cone on the other.

4. The electrical capacitor of claim 1 wherein the capacitor is about ½ to 3 inches long with enough windings to have a capacitance of about 0.5 to 1.0 microfarad and the improvement wherein the exposed edges are offset about 1 to 2 mils with respect to each other.

5. In a process of preparing an electrical capacitor by convolutely winding a metallized dielectric, coating the terminal ends with metal, and attaching an electrical connector to the metal coating forming a terminal, the improvement of continuously offsetting one layer with respect to the other as the convolutions are made.

6. The process of preparing an electrical capacitor according to claim 4 in which the offsetting convoluted layers are irregularly staggered with respect to each other.

7. The process of preparing an electrical capacitor according to claim 4 in which the offsetting convoluted layers are regularly staggered in the general shape of a truncated cone protruding at one end and an inverted cone on the other.

* * * * *